US 8,296,651 B2

(12) United States Patent
Bravery et al.

(10) Patent No.: US 8,296,651 B2
(45) Date of Patent: Oct. 23, 2012

(54) SELECTING TERMS FOR A GLOSSARY IN A DOCUMENT PROCESSING SYSTEM

(75) Inventors: Andrew James Frederick Bravery, Salisbury (GB); Gordon Douglas Hutchison, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 1368 days.

(21) Appl. No.: 11/624,766

(22) Filed: Jan. 19, 2007

(65) Prior Publication Data
US 2008/0177725 A1  Jul. 24, 2008

(30) Foreign Application Priority Data
Jun. 8, 2006  (GB) .................................. 0611303.9

(51) Int. Cl.
*G06F 17/21* (2006.01)
(52) U.S. Cl. ...................................................... 715/259
(58) Field of Classification Search .................. 715/259, 715/270, 254
See application file for complete search history.

(56) References Cited

U.S. PATENT DOCUMENTS

| | | | | |
|---|---|---|---|---|
| 5,423,032 A * | 6/1995 | Byrd et al. | ............................. | 1/1 |
| 5,850,561 A * | 12/1998 | Church et al. | ................ | 715/234 |
| 6,377,949 B1 * | 4/2002 | Gilmour | ............................... | 1/1 |
| 6,457,026 B1 * | 9/2002 | Graham et al. | ............... | 715/234 |
| 6,651,058 B1 * | 11/2003 | Sundaresan et al. | .................. | 1/1 |
| 6,708,311 B1 * | 3/2004 | Berstis | .......................... | 715/206 |
| 6,785,869 B1 * | 8/2004 | Berstis | .......................... | 715/210 |
| 6,978,274 B1 * | 12/2005 | Gallivan et al. | ........................ | 1/1 |
| 7,136,876 B1 * | 11/2006 | Adar et al. | ................. | 707/104.1 |
| 2003/0018670 A1 * | 1/2003 | Ashford et al. | ............... | 707/532 |
| 2003/0233235 A1 * | 12/2003 | Park | ............................. | 704/257 |
| 2004/0034525 A1 * | 2/2004 | Pentheroudakis et al. | ........ | 704/9 |
| 2004/0148156 A1 * | 7/2004 | Hawkins | .......................... | 704/10 |
| 2004/0148381 A1 * | 7/2004 | Beppu et al. | ................... | 709/223 |
| 2004/0187084 A1 * | 9/2004 | Berstis | .......................... | 715/532 |
| 2004/0205672 A1 * | 10/2004 | Bates et al. | ................... | 715/533 |
| 2005/0022106 A1 * | 1/2005 | Kawai et al. | ................... | 715/500 |
| 2005/0234709 A1 | 10/2005 | Klavans et al. | | |
| 2005/0283357 A1 * | 12/2005 | MacLennan et al. | ............. | 704/4 |
| 2006/0047689 A1 * | 3/2006 | Gabbert et al. | ............... | 707/102 |
| 2007/0112554 A1 * | 5/2007 | Goradia | .............................. | 704/4 |
| 2007/0282780 A1 * | 12/2007 | Regier et al. | .................... | 706/59 |

OTHER PUBLICATIONS

Kozalov et al., "Glossary Extraction and Utilization in the Information Search and Delivery System for IBM Technical Support," IBM Systems Journal, vol. 43, No. 3, 2004, pp. 546-563.*
Feldman et al., "Text Mining at the Term Level," Lecture Notes in Computer Science, vol. 1510, Proceedings of the Second European Symposium on Principles of Data Mining and Knowledge Discovery, 1998, pp. 1-9.*
Nadeau et al., "A Supervised Learning Approach to Acronym Identification," Lecture Notes in Computer Science, vol. 3501, 2005, pp. 319-329.*

(Continued)

*Primary Examiner* — Laurie Ries
*Assistant Examiner* — Frank D Mills
(74) *Attorney, Agent, or Firm* — Yudell Isidore Ng Russell PLLC

(57) ABSTRACT

A method, apparatus and computer program element are disclosed for selecting a term for inclusion in a glossary in a document handling or processing system in which a set of functions or rules are applied to the term in order to provide a probability measure for the terms being suitable for inclusion in said glossary.

20 Claims, 3 Drawing Sheets

OTHER PUBLICATIONS

Park et al., Automatic Glossary Extraction: Beyond Terminology Identification, 2002, ACM International Conference on Computational Linguistics—Proceedings of the 19th Initernational Conference on Computational Linguistics, vol. 1, pp. 1-7.*

Bernth et al., IBM Research Report: Terminology Extraction for Global Content Management, 2002, IBM T.J. Watson Research Center, pp. 1-14.*

Shi et al., Building a Protein Name Dictionary From Full Text: A Machine Learning Term Extraction Approach, Apr. 7, 2005, BMC Bioinformatics 2005, vol. 6:88, pp. 1-13.*

Park et al., Identification of Probable Real Words: An Entropy-Based Approach, 2002, ACL Unsupervised Lexical Acquisition—Proceedings of the Workshop of the ACL Special Interest Group, pp. 1-8.*

* cited by examiner

US 8,296,651 B2

SELECTING TERMS FOR A GLOSSARY IN A DOCUMENT PROCESSING SYSTEM

FIELD OF INVENTION

The present invention relates to a method, apparatus and computer program element for selecting terms for a glossary in a document processing system.

BACKGROUND OF THE INVENTION

Glossaries are information repositories that hold information defining particular terms such as acronyms, specialist language or jargon, that are used in a collection of data or documents. In computer based document handling and processing systems, automatic links can be provided, such as hotlinks or hyperlinks, which provide for the automatic display of the glossary definition for a given term.

In order to build such a glossary in a document processing system, the glossary terms must first be identified and selected from the documents to which the glossary will apply. Once selected, each term must then be defined in the glossary, in other words, and explanation of the acronym, specialist language or jargon must be entered. Each glossary term is then linked to each occurrence of the term within the relevant documents. If the documents or glossary are modified, the links to the terms need to be properly maintained.

One problem with existing document handling or processing systems is that the identification of relevant glossary terms is a time consuming and laborious process. Furthermore, maintaining a glossary in view of modifications to the document to which it applies is also a time consuming and laborious process.

SUMMARY OF THE INVENTION

An embodiment of the invention provides a method for selecting one or more terms for a glossary in a document processing system, the method comprising the steps of:
  a) receiving a term selected from a document;
  b) applying a set of one or more rules to the term, each rule being arranged to assign a result value to the term;
  c) applying a function to the term, the function being arranged to use one or more of the assigned result values to produce a probability value relating to the likelihood of the term being a candidate for inclusion in a glossary associated with the document; and
  d) presenting the term to a user as a candidate for inclusion in the glossary.

The method may comprise the further step of comparing the probability value for the term against a threshold probability value and only if the probability value exceeds the threshold then presenting the term to the user as a candidate for inclusion in the glossary. A plurality of the terms with associated probability values may be presented to the user, the terms being presented in a list ordered by the associated probability values. One or more of the rules may produce result values based on the context of the or each term. The rules and function may comprise a Boolean function.

If the user accepts the term then the term may be added to the glossary. If the term is added to the glossary then the user may be prompted to add a definition for the term in the glossary. If the user rejects more than a predetermined number of consecutive terms in the ordered list then no further terms may be presented to the user. The terms may be selected from the document by a spelling checking system. The terms may be selected from the document in response to user selection of the term. The result value for one or more of the rules may be recorded for a given term and correlated with the user selection or rejection of the given term so as to maintain a probability value for a result value resulting in the corresponding term being included in the glossary.

Another embodiment of the invention provides apparatus for selecting one or more terms for a glossary in a document processing system, the apparatus being operable to:
  a) receive a term selected from a document;
  b) apply a set of one or more rules to the term, each rule being arranged to assign a result value to the term;
  c) apply a function to the term, the function being arranged to use one or more of the assigned result values to produce a probability value relating to the likelihood of the term being a candidate for inclusion in a glossary associated with the document; and
  d) present the term to a user as a candidate for inclusion in the glossary.

A further embodiment of the invention provides a computer program element containing computer loadable instructions for enabling a programmable device or group of such devices to carry out a method for selecting one or more terms for a glossary in a document processing system, the method comprising the steps of:
  a) receiving a term selected from a document;
  b) applying a set of one or more rules to the term, each rule being arranged to assign a result value to the term;
  c) applying a function to the term, the function being arranged to use one or more of the assigned result values to produce a probability value relating to the likelihood of the term being a candidate for inclusion in a glossary associated with the document; and
  d) presenting the term to a user as a candidate for inclusion in the glossary.

A further embodiment of the invention provides software for enabling a programmable device or group of such devices to provide apparatus for selecting one or more terms for a glossary in a document processing system, the apparatus being operable to:
  a) receive a term selected from a document;
  b) apply a set of one or more rules to the term, each rule being arranged to assign a result value to the term;
  c) apply a function to the term, the function being arranged to use one or more of the assigned result values to produce a probability value relating to the likelihood of the term being a candidate for inclusion in a glossary associated with the document; and
  d) present the term to a user as a candidate for inclusion in the glossary.

BRIEF DESCRIPTION OF THE DRAWINGS

Embodiments of the invention will now be described, by way of example only, with reference to the accompanying drawings in which.

DETAILED DESCRIPTION OF PREFERRED EMBODIMENTS

Figure 1:
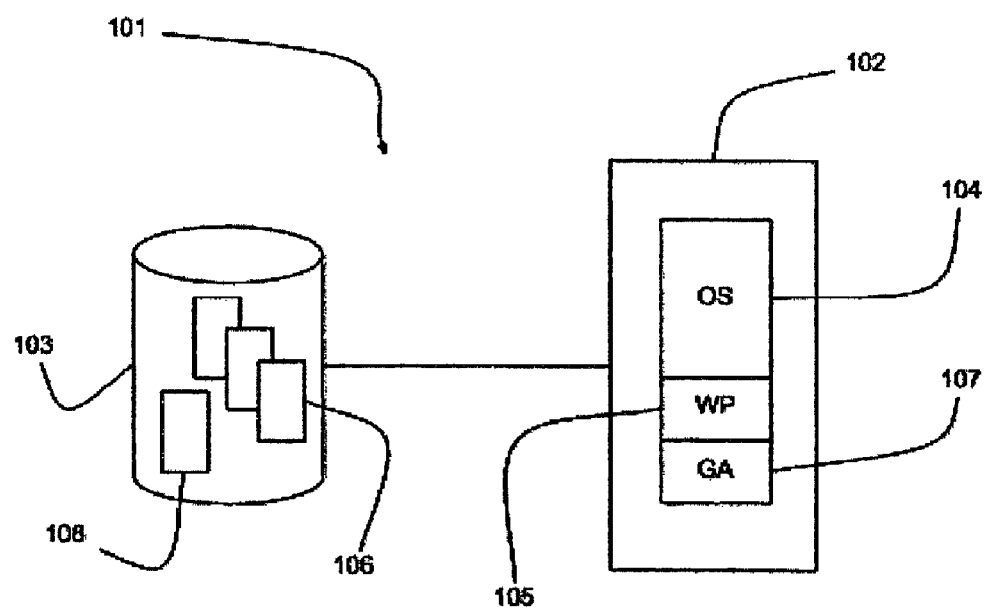
FIG. 1 is a schematic illustration of a document processing system.

With reference to FIG. 1, a computer system 101 comprises a computer 102 connected to a data storage device 103 in the form of a disk drive. The computer 102 is running an operating system 104 and a document handling or processing application program in the form of a word processing application program 105. The data storage device 103 is used to store a set of documents 106 which are created, edited and handled by the word processing application program 105. The word processing application program 105 comprises a glossary agent program 107, which is arranged to automatically select terms from one or more of the documents 106 for inclusion in a glossary 108 associated with one or more of the documents 106.

Figure 2:
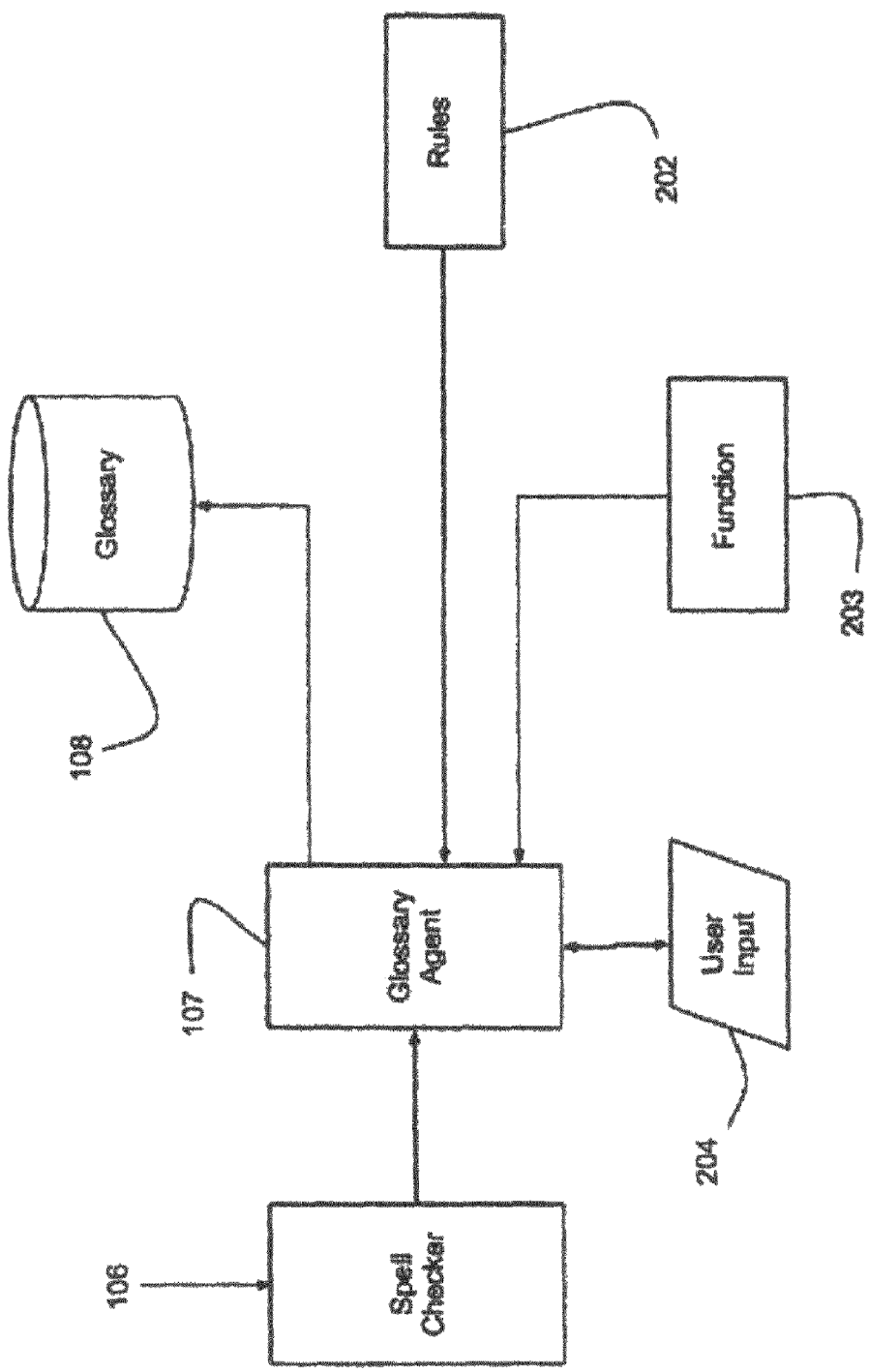
FIG. 2 is a schematic illustration of elements of the system of FIG. 1.

With reference to FIG. 2, the glossary agent 107 is arranged to receive input from a spelling checker 106, which is part of the document processing application program 105. The input is in the form of a list of words or phrases from a document being processed, which the spelling checker 106 has rejected either automatically or as a result of user input. These words or phrases are referred to as terms. The glossary agent 107 then processes each input term using a set of rules 202, each rule being arranged to assign a result value or score to an input term. The glossary agent 107 then uses a function 203 to process the result values assigned by each rule to determine a probability value for the term being a candidate for inclusion in the glossary 108. The glossary agent 107 then presents a candidate list of processed terms for a user to judge whether or not each term should be included in or excluded from the glossary 108. Depending on the users input 204, each processed term is either allocated to the glossary 108 or rejected and discarded. Each term stored in the glossary 108 includes a record of the result values assigned to it by each rule. When a term is stored in the glossary 108, the user is prompted by the glossary agent 107 to add a definition for the term.

In the present embodiment, four rules 202 are each arranged to assign one of a set of result values to each processed term. The rules are as follows:

Rule 1: The term is not in the dictionary but appears more than three times with its particular spelling in the current document. The result value is true or false.

Rule 2: The term appears capitalised in a non-capitalised context such as outside a title in the current document. The result value is true or false.

Rule 3: The term appears more often than expected for its word type in the current document. The result value is a probability value where 100 is the expected amount and, for example, a result value of 130 represents 30% more often than expected.

Rule 4: The term always occurs as part of the same short sequence of words in the current document. The result value is true or false.

The function 203 is arranged, in the present embodiment, to combine the result values for each of the rules 203 to produce a probability value relating to the likelihood of the term being a candidate for inclusion in the glossary associated with the document. The function 203 is initialised with a base probability, that is, the probability of any given term being a glossary term. In other words, the base probability is the percentage of terms in a typical document of this author, size, or type that are already glossary terms, for example, 7%. In cases where the glossary is empty, the base probability is set to an arbitrary value.

For terms that produce a Boolean result value of "true" for a given rule, the function is arranged to determine what percentage of words or phrases previously given a result of "true" by that rule have been accepted into the glossary. This percentage is then treated as the probability of the term for the given rule being a glossary term. For terms that produce a Boolean result value of "false" for a given rule, the function is arranged to determine what percentage of words or phrases previously given a result of "false" by that rule have been accepted into the glossary. This percentage is then treated as the probability of the term for the given rule being a glossary term. For rules, which produce an ordinal or percentage result value, the system evaluates the probability of previous terms having a similar score, for the given rule, being a glossary term and then treats this resulting probability as the probability for the given term.

The function 203 is arranged to record the results of each such rule and to log against each result, an indication of whether or not the evaluated terms was subsequently included in the glossary. In this way, the function 203 is able to maintain the probability, for each rule, of a given term being a glossary term. This percentage is the percentage of terms for which a given rule evaluated to true or false and that have then been selected to be in the glossary. The percentage can be treated as a success rate for correlating the rule's results with the user's choice to add a word to the glossary. Thus the glossary becomes a super-set of words that that have been successfully predicted by the set of rules.

Once the probabilities for each term have been determined by the rules 202, they are combined by the function 203 to produce an average overall probability for the term being a glossary term. The overall probability is then compared to a threshold probability value. All terms with a probability equal to or greater than the threshold are included in the candidate list of terms for the glossary that is presented to the user. The user then selects terms from the candidate list for inclusion in or exclusion from the glossary 108. By way of example, assume a term T was assigned the following result values by rules 1 to 4:

T [true, false, 130, true]

This set of result values would be converted into a set of probability values as follows:

T [70, 7, 30, 80]

This set of probability values indicate that, for all terms evaluated by rule 1 with a result value of "true", 70% have been selected by the user for inclusion in the glossary. Similarly, for all terms evaluated by rule 4, with a result value of "true", 80% have been selected by the user for inclusion in the glossary. Furthermore, according to rule 3, the term occurs with a frequency twice that for the norm for its word type. The base probability value is 7%, which is assigned to the result value for rule 2. These probability values are averaged to produce an overall probability of 46.75%. Given, in this example, a threshold of 40%, the term T is added to the list of candidate terms for inclusion in the glossary 108.

Figure 3:
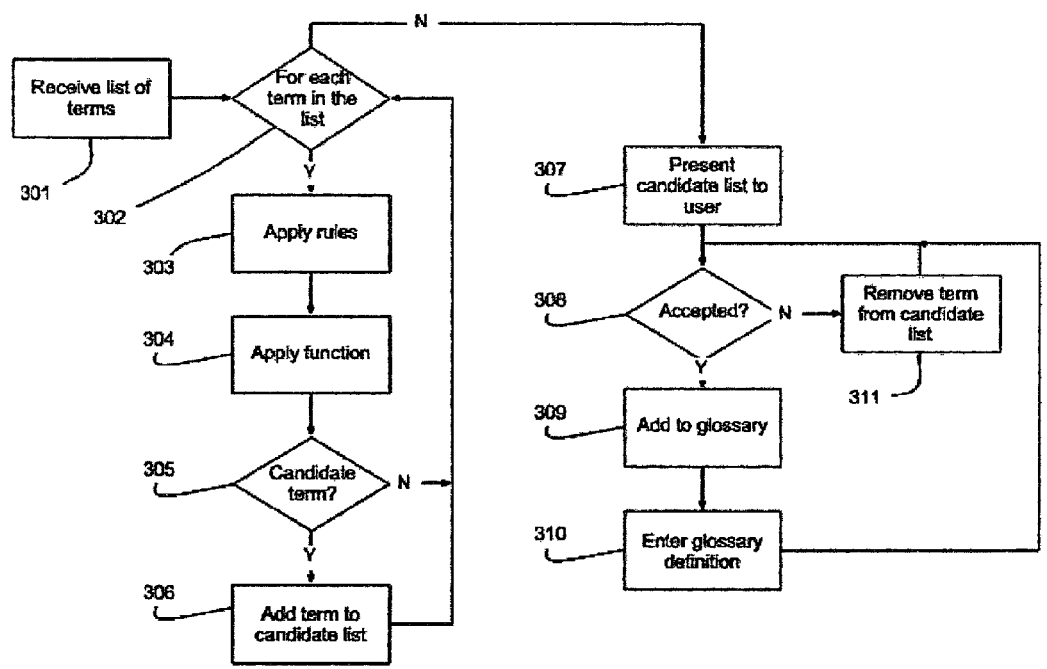
FIG. 3 is a flow chart illustrating processing carried out by the elements of FIG. 2.

The processing carried out by the glossary agent 107 will now be described in further detail with reference to FIG. 3. At step 301, the glossary agent receives a list of terms from the spelling checker 106 and processing moves to step 302. From step 302, each term in the list is processed in turn in accordance with the following four steps 303, 304, 305, 306. At step 303, the four rules 202 are applied to the term, assigning a set of result values and the results for each rule are recorded. Processing then moves to step 304 where the function 203 is applied to the set of result values for the term to produce an overall probability of the term being a glossary term. Processing then moves to step 305 where the overall probability value is compared the threshold probability value and if the overall probability value meets or exceeds the threshold, processing moves to step 306 where the term is added to the list of candidate terms for presentation to the user. From step 306, processing returns to step 302 and continues as described above. If at step 305 the overall probability is below the threshold then processing returns straight to step 302. If at step 302 all the terms in the list have been processed then processing moves to step 307.

At step 307, the list of candidate terms for the glossary 108 is presented to the user and processing moves to step 308. At step 308, processing responds to the acceptance of any term by the user by moving to step 309 where the term is added to the glossary 108. The acceptance or rejection of a given term is recorded by the function 203 against each of the rules 202 in order to maintain the record of the probability for each rule of a given term being a glossary term. Processing then moves to step 310 where the user is prompted to add a definition for the term. If at step 308, a term is rejected by the user then processing moves to step 311 where the term is removed from the list of candidate terms and processing returns to step 308 to await further user input. Processing continues until all of the terms in the candidate list have either been accepted into the glossary or rejected.

As will be understood by those skilled in the art, the rules may be selected from a larger group of such rules. The starting point for many rules may be the set of words in a given document. This could be a complete or partially complete document. The result value type can be varied between rules as long as the function is arranged to interpret the result values accordingly. In other words, rules provide a score and the function is arranged to identify the correlation with the existing glossary terms and any increase/decrease in the likelihood of a term being a glossary term given a certain result value. Examples of rules in this group are set out below:

1) Filtering rules arranged to eliminate all words that are not nouns, adjectives or verbs. In the above embodiment, this rule is employed in the spelling checker.

2) Detecting rules arranged to detect all words that are not in the dictionary, such as spelling mistakes or new terms. Again, in the above embodiment, this rule is employed in the spelling checker.

3) Significance rules for determining the frequency of words in a given document to give an idea of their importance to the document. A word used a large number of times might warrant definition in the context of this document. Similarly, words only used once might also be selected as they might be indicating a key concept.

4) Style rules arranged to identify patterns in an authors writing style. For example, patterns in the way terms are used in documents by an author can be detected and refined as the author builds their document portfolio. These patterns are then used to identify word sequences in new documents as they are created and hence identify potential new glossary terms.

The record of result values and user inclusion or exclusion for each rule is kept to avoid a recalculation each time a rule is applied. A false result value can be as important as a true result value, as is whether a term was accepted or rejected. In some embodiments, the following percentages are maintained for each rule:

1) The rule evaluated to true and the term was accepted into the glossary;
2) The rule evaluated to false and the term was accepted into the glossary;
3) The rule evaluated to true and term was rejected; and
4) The rule evaluated to false and term was rejected.

The usefulness of the rule is dependent on how contradictory the values for these percentages are. For example, if a given rule scored a high percentage for "false and accepted" and a high percentage for "true and rejected" then this would be a significantly reliable rule. Similarly, if a rule scored highly for "true and accepted" and "false and accepted" then the rule would be less useful. This usefulness assessment enables the system to learn or improve over time.

In a further embodiment, the candidate terms presented to the user are ranked by their respective overall probability values. In another embodiment, the probability threshold is omitted and all terms are ranked and presented to the user in the candidate list. The terms may be sorted in descending order of overall probability value. A cut-off point may be configured so that after a user rejects three consecutive terms in the list, no further lower ranking terms are presented.

In another embodiment, the glossary agent is arranged to detect user input in relation to a term, which suggests that the term should be entered and defined in the glossary. For example, if a reader of a document double clicks on a particular term more than three times, the glossary agent may be arranged to flag the term to the author of the document for inclusion in a relevant glossary. In a further embodiment, the glossary agent may be arranged to present potential glossary terms to the user as they are typed.

In another embodiment, candidate terms rejected by the user are stored in a rejected terms store and a "false" probability for each rule is determined from the rejected terms instead of using the base probability value. In a further embodiment, when a predetermined number of terms have been added to the glossary, the glossary agent is arranged to recalculate the overall probability value for each term in the glossary. The recalculation may include terms from the rejected term store, which may be then included in the glossary.

It will be understood by those skilled in the art that the apparatus that embodies a part or all of the present invention may be a general purpose device having software arranged to provide a part or all of an embodiment of the invention. The device could be single device or a group of devices and the software could be a single program or a set of programs. Furthermore, any or all of the software used to implement the invention can be communicated via any suitable transmission or storage means so that the software can be loaded onto one or more devices.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

The invention claimed is:

1. A computer-implemented method for selecting one or more terms for a glossary in a document processing system, said method comprising:
a processor executing program code that performs the functions of:
receiving, from a spell checker, a selected term from within a document that has been rejected, where said term is one of a misspelled word or a misspelled phrase;
applying a set of one or more rules to said term, each of said rule being arranged to assign a result value to said term as at least one of a Boolean or ordinal value, wherein said result value is an output score of the term when processed by a rule;
applying a function to said term, said function being arranged to combine said assigned result values to produce an overall probability value relating to the likelihood of said term being a candidate for inclusion in a glossary associated with said document;

presenting:
said term as a candidate term for inclusion in said glossary, and
said assigned result values;

in response to receiving an approval to include said candidate term in the glossary, storing said candidate term to said glossary with a record of one or more of said result values assigned by said set of one or more rules;

in response to receiving a denial to include said candidate term in said glossary, discarding said candidate term; and providing an indication of whether said term was subsequently included in said glossary.

2. The method according to claim 1, further comprising:
comparing said probability value for said term with a threshold probability value, wherein the candidate term is only presented responsive to said probability value exceeding said threshold probability value for inclusion in said glossary.

3. The method according to claim 1, wherein said candidate term is presented as one of one or more terms in a list, wherein each said term of said one or more terms in said list is presented with overall probability values, and wherein said list is ordered by said overall probability values.

4. The method according to claim 1, wherein said one or more rules produce said result values based on the context of said term.

5. The method according to claim 1, wherein said rules and function comprise a Boolean function.

6. The method according to claim 1, further comprising, issuing a prompt for adding a definition for said term to said glossary.

7. The method according to claim 1, further comprising, in response to receiving a rejection for more than a predetermined number of consecutive said one or more terms in an ordered list, stopping presentation of said one or more terms in said list.

8. A method according to claim 1, further comprising:
issuing a request to add all selected terms in said document to said glossary in response to selection of said term; and
in response to receiving approval of said request to add all selected terms, adding all selected terms in said document to said glossary.

9. The method according to claim 1, wherein the result value for one or more of said rules are recorded for a given said term and correlated with said selection or rejection of given term so as to maintain a probability value for each said result value resulting in given said term being included in said glossary.

10. The method of claim 1, wherein the rules further comprise:
a) in response to said term not being an existing entry in said glossary:
issuing a result value of true responsive to said term appearing more than three times in said current document, and
issuing a result value of false responsive to said term appearing three or fewer times in said current document;
b) in response to said term being capitalized:
in a non-capitalized context, issuing a result value of true, and
in a capitalized context, issuing a result value of false, and c) in response to said term appearing more frequently than an expected amount of appearances for a given word type in said document, issuing a probability result value, wherein the probability result value is the total percentage of appearances of said term relative to said expected amount of appearances of said term; and d) in response to said term occurring as part of a sequence of words in said document:
issuing a result value of true responsive to said term always occurring as part of said short sequence of words, and
issuing a result value of false responsive to said term not always occurring as part of said short sequence of words.

11. An apparatus for selecting one or more terms for a glossary in a document processing system, comprising:
a processor;
a memory; and
a data storage coupled to the processor, the data storage comprising instructions that, when executed by the processor, causes the apparatus to:
receive a selected term from within a document at said computer that has been rejected by a spell checker selected from a document where said term is one of a misspelled word or a misspelled phrase;
apply a set of one or more rules to said term, each of said rule being arranged to assign a result value to said term as at least one of a Boolean or ordinal value, wherein said result value is an output score of the term when processed by a rule;
apply a function to said term, said function being arranged to combine said assigned result values to produce an overall probability value relating to the likelihood of said term being a candidate for inclusion in a glossary associated with said document; and
present:
said term as a candidate term for inclusion in said glossary, and
said assigned result values;
in response to receiving an approval to include said candidate term in the glossary, store said candidate term to said glossary with a record of one or more of said result values assigned by said set of one or more rules;
in response to receiving a denial to include said candidate term in said glossary, discard said candidate term; and
provide an indication of whether said term was subsequently included in said glossary.

12. The apparatus according to claim 11, wherein said processor being further operable to compare said probability value for said term with a threshold probability value, wherein the candidate term is only presented responsive to said probability value exceeding said threshold probability value.

13. The apparatus according to claim 11, wherein said candidate term is presented as one of one or more terms in a list, wherein each said term of said one or more terms in said list is presented with overall probability values, and wherein said list is ordered by said overall probability values.

14. The apparatus according to claim 11, wherein said one or more rules produce said result values based on the context of said term.

15. The apparatus according to claim 11, wherein said rules and function comprise a Boolean function.

16. The method according to claim 11, further comprising, issue a prompt for adding a definition for said term to said glossary.

17. An apparatus according to claim 16, further comprising, in response to receiving a rejection for more than a predetermined number of consecutive said one or more terms in an ordered list, stop presenting of said one or more terms in said list.

18. The apparatus according to claim 11, wherein the rules further comprise instructions that when executed by the computer cause the apparatus to perform the following functions:
   a) in response to said term not being an existing entry in said glossary:
      issue a result value of true responsive to said term appearing more than three times in said current document, and
      issue a result value of false responsive to said term appearing three or fewer times in said current document;
   b) in response to said term being capitalized:
      in a non-capitalized context, issue a result value of true, and
      in a capitalized context, issue a result value of false, and
   c) in response to said term appearing more frequently than an expected amount of appearances for a given word type in said document, issue a probability result value, wherein the probability result value is the total percentage of appearances of said term relative to said expected amount of appearances of said term; and
   d) in response to said term occurring as part of a sequence of words in said document:
      issue a result value of true responsive to said term always occurring as part of said short sequence of words, and
      issue a result value of false responsive to said term not always occurring as part of said short sequence of words.

19. A computer-readable storage medium having a plurality of instructions processable by a machine embodied therein, wherein the plurality of instructions, when processed by the machine, cause the machine to perform a method, the method comprising:
   receiving, from a spell checker, a selected term from within a document that has been rejected, where said term is one of a misspelled word or a misspelled phrase;
   applying a set of one or more rules to said term, each of said rule being arranged to assign a result value to said term as at least one of a Boolean or ordinal value, wherein said result value is an output score of the term when processed by a rule, and wherein said one or more rules produce said result values based on the context of said term;
   applying a function to said term, said function being arranged to combine said assigned result values to produce an overall probability value relating to the likelihood of said term being a candidate for inclusion in a glossary associated with said document;
   comparing said probability value for said term with a threshold probability value;
   responsive to said probability value exceeding said threshold probability value, presenting:
      said term as a candidate term for inclusion in said glossary,
      said assigned result values, and
      wherein said candidate term is presented as one of one or more terms in a list, wherein each said term of said one or more terms in said list is presented with overall probability values, and wherein said list is ordered by said overall probability values;
   in response to receiving an approval to include said candidate term in the glossary:
      storing said candidate term to said glossary with a record of one or more said result values assigned by said set of one or more rules,
      issuing a prompt for adding a definition for said term to said glossary,
      issuing a request to add all selected terms in said document to said glossary in response to selection of said term, and
   in response to receiving approval of said request to add all selected terms, adding all selected terms in said document to said glossary;
   in response to receiving a denial to include said candidate term in said glossary, discarding said candidate term;
   wherein the result value for one or more of said rules are recorded for a given said term and correlated with said selection or rejection of given term so as to maintain a probability value for each said result value resulting in given said term being included in said glossary; and
   in response to receiving a denial to include said candidate term in said glossary for more than a predetermined number of consecutive said one or more terms in an ordered list, stopping presenting of said one or more terms in said list;
   providing an indication of whether said term was subsequently included in said glossary.

20. The computer-readable storage medium of claim 19, wherein the rules further comprise instructions for each of:
   a) in response to said term not being an existing entry in said glossary:
      issue a result value of true responsive to said term appearing more than three times in said current document, and
      issue a result value of false responsive to said term appearing three or fewer times in said document;
   b) in response to said term being capitalized:
      in a non-capitalized content, issue a result value of true, and
      in a capitalized context, issue a result value of false, and
   c) in response to said term appearing more frequently than an expected amount of appearances for a given word type in said document, issue a probability result value, wherein the probability result value is the total percentage of appearances of said term relative to said expected amount of appearances of said term; and
   d) in response to said term occurring as part of a sequence of words in said document:
   issue a result value of true responsive to said term always occurring as part of said short sequence of words, and
   issue a result value of false responsive to said term not always occurring as part of said short sequence of words.

* * * * *